(12) United States Patent
Tak et al.

(10) Patent No.: US 7,978,584 B2
(45) Date of Patent: Jul. 12, 2011

(54) PATTERN RECOGNITION TYPE OPTICAL MEMORY AND OPTICAL READ/WRITE DEVICE AND METHOD FOR READING AND WRITING DATA FROM OR TO THE MEMORY

(75) Inventors: Nam-kyun Tak, Suwon-si (KR); Chang-hyun Kim, Seongnam-si (KR); Yeong-taek Lee, Seoul (KR); Jae-woong Hyun, Uijoongbu-si (KR)

(73) Assignee: Samsung Electronics Co., Ltd. (KR)

( * ) Notice: Subject to any disclaimer, the term of this patent is extended or adjusted under 35 U.S.C. 154(b) by 1230 days.

(21) Appl. No.: 11/646,645

(22) Filed: Dec. 28, 2006

(65) Prior Publication Data

US 2007/0153664 A1    Jul. 5, 2007

(30) Foreign Application Priority Data

Dec. 30, 2005    (KR) ........................ 10-2005-0135871

(51) Int. Cl.
*G11B 7/004* (2006.01)
(52) U.S. Cl. ..................................... 369/100
(58) Field of Classification Search .................. 369/100, 369/112.01, 124.01, 125
See application file for complete search history.

(56) References Cited

U.S. PATENT DOCUMENTS

| | | | |
|---|---|---|---|
| 5,412,592 A * | 5/1995 | Krishnamoorthy et al. | 365/49 |
| 6,961,161 B2 | 11/2005 | Tsukagoshi et al. | 359/10 |
| 7,002,891 B2 | 2/2006 | Horimai | 369/103 |
| 2003/0156525 A1 * | 8/2003 | Fan et al. | 369/110.04 |
| 2004/0042374 A1 | 3/2004 | Horimai | 369/103 |
| 2004/0218241 A1 | 11/2004 | Roh | 359/35 |
| 2006/0114791 A1 * | 6/2006 | Marshall et al. | 369/100 |
| 2006/0176799 A1 * | 8/2006 | Hirono | 369/103 |
| 2006/0268380 A1 * | 11/2006 | Chao et al. | 359/15 |

FOREIGN PATENT DOCUMENTS

| | | |
|---|---|---|
| JP | 09-120538 A | 5/1997 |
| JP | 2001-202626 A | 7/2001 |
| JP | 2005-070675 A | 3/2005 |
| KR | 1992-0020266 B1 | 11/1992 |
| KR | 10-2004-0093771 A | 9/2004 |
| WO | WO 02/15176 A1 | 2/2002 |

* cited by examiner

*Primary Examiner* — Andrew W Johns
(74) *Attorney, Agent, or Firm* — Mills & Onello, LLP (57) ABSTRACT

There is provided a method and device for reading, writing, or both, data from or to a pattern recognition type optical memory having a light transmittable substrate. Patterns can be formed in the pattern recognition type optical memory from light images representing the data. An optical memory reading device comprises a light source, an image detecting unit for detecting images corresponding to the patterns and generating image signals converted by an optical/electric converter into electric signals. An optical memory writing device comprises a light source, an electric/optical converter for receiving an electric signal corresponding to the data and converting the electric signal into an image signal, and an image generation unit for receiving the light emitted from the light source and the image signal and generating light images corresponding to the image signal, wherein the images are configured to form the patterns on the light transmittable substrate.

22 Claims, 6 Drawing Sheets

PATTERN RECOGNITION TYPE OPTICAL MEMORY AND OPTICAL READ/WRITE DEVICE AND METHOD FOR READING AND WRITING DATA FROM OR TO THE MEMORY

CROSS-REFERENCE TO RELATED PATENT APPLICATION

This application claims priority under 35 U.S. C. §119 from commonly owned Korean Patent Application No. 10-2005-0135871, filed on Dec. 30, 2005, in the Korean Intellectual Property Office, the disclosure of which is incorporated herein in its entirety by reference.

BACKGROUND OF THE INVENTION

1. Field of the Invention

The present invention relates to a pattern recognition type optical memory device, a method for reading data from the memory, and a method for writing data to the memory.

2. Description of the Related Art

In a conventional method of processing data stored in a storage device using an atomic force microscope (AFM), a pattern formed on the surface of the storage device is detected using a probe formed on an extreme end of a micro cantilever. The cantilever is designed to flex up or down, even by applying only a minute force. The probe is suspended on the extreme end of the cantilever and has a size corresponding to several atoms. When the probe approaches the surface of a sample device, an attractive or repulsive force is generated between an atom of the probe and an atom of the surface of the sample according to a distance between the atoms. Data from the surface is detected by detecting the resulting force exerted on the probe.

IBM's Millipede is well known as a typical storage device which processes data using an AFM. The writing operation of the Millipede is performed by forming an indentation on a storage medium formed of poly-methyl methacrylate (PMMA). The indentation is formed by heat generated by a resistive heater embedded in a tip of the AFM.

The data written using the above writing operation is read by detecting a degree of flexure of the cantilever using a piezoresister when the tip of the cantilever scans the storage medium.

The quality of the data storage device, to or from which the data is written or read, depends on the density, speed and power consumption properties thereof. That is, it is important to design the data storage device with high-density, high-speed and low power.

However, when elements of the prior art data storage device are nanometer-sized, resolution problems occur, which make it difficult to detect the shape of a pattern. Also, there is a limitation in the size reduction of the elements due to a physical limitation in forming the pattern. Furthermore, when the data is processed using the cantilever, the data reading and writing cannot be performed during the time taken to move the cantilever to a next position to again perform the sensing or detecting operation.

SUMMARY OF THE INVENTION

The present invention provides a pattern recognition type optical memory with high-density, high-speed and low-power consumption and a data processing unit for processing data of the pattern recognition type optical memory using light.

According to an aspect of the present invention, there is provided an optical memory reading device for reading data from a pattern recognition type optical memory having a light transmittable substrate on which patterns corresponding to data are formed. The optical memory reading device comprises: a light source configured to direct light onto the optical pattern recognition type optical memory; an image detecting unit configured to detect images corresponding to the patterns by receiving light transmitted through the pattern recognition type optical memory; and an optical/electric converter configured to convert the image signals input from the image detecting unit into electric signals.

The optical memory reading device can further include an image magnifying unit disposed between the pattern recognition type optical memory and the image detecting unit.

The image magnifying unit can include at least one lens configured to diffuse the light transmitted through the pattern recognition type optical memory.

The image detecting unit and the optical/electric converter can be interconnected by an optical fiber.

The light source can be placed below the pattern recognition type optical memory such that the light transmitted through the substrate can be transferred to the image detecting unit.

A reflection plate can be formed at a bottom surface of the substrate and the light source can be placed above the pattern recognition type optical memory such that the light transmitted through the substrate can be reflected from the reflection plate to the image detecting unit.

The patterns can include at least one multi-bit pattern corresponding to a predefined shape configured to represent a set of bits.

According to another aspect of the present invention, there is provided a pattern recognition type optical memory including: a substrate through which light can be transmitted; and a photosensitive layer formed on a top surface of the substrate and configured to change state in response to received light having an intensity higher than a threshold value, wherein photosensitive layer is configured to have its state selectively varied to form patterns in response to received light corresponding to images representing data.

The pattern recognition type optical memory can further comprise a reflection layer formed on a bottom surface of the substrate.

In the pattern recognition type optical memory, the patterns can include at least one multi-bit pattern corresponding to a predefined shape configured to represent a set of bits.

According to another aspect of the present invention, there is provided an optical memory writing device for writing data to a pattern recognition optical by forming patterns corresponding to data on a light transmittable substrate by using light. The optical memory writing device includes: a light source configured to emit light; an electric/optical converter configured to receive electric signals corresponding to the data and to convert the electric signals into image signals; and an image generation unit configured to receive the light emitted from the light source and the image signals and to generate light images corresponding to the image signals, wherein the images are configured to form the patterns on the light transmittable substrate.

The optical memory writing device can further include an image reduction unit disposed between the pattern recognition type optical memory and the image generation unit.

In the optical memory writing device, the image reduction unit can comprise at least one lens configured to focus the light images onto the pattern recognition type optical memory.

In the optical memory writing device, the image generation unit and the electric/optical converter can be connected by an optical fiber.

In the optical memory writing device, the patterns can include at least one multi-bit pattern corresponding to a predefined shape configured to represent a set of bits.

According to another aspect of the present invention, there is provided an optical memory read/write device including: a reading unit configured to read data from a pattern recognition type optical memory having a light transmittable substrate on which patterns are formed; and a writing unit configured to write input data to the pattern recognition type optical memory by forming patterns corresponding to data on the light transmittable substrate. The reading unit can include a first light source configured to direct light onto the pattern recognition type optical memory, an image detecting unit configured to detect images corresponding to the patterns formed by transmitting light through the substrate, and an optical/electric converter configured to convert the image signals input from the image detecting unit into electric signals. And the writing unit can include a second light source configured to emit light, an electric/optical converter configured to receive electric signals corresponding to the data and to convert the electric signals into corresponding image signals, and an image generation unit configured to receive the light emitted from the second light source and the image signals and to generate light images corresponding to the image signals, wherein the images are configured to form patterns on the light transmittable substrate.

In the optical memory read/write device, the first light source can be disposed below the pattern recognition type optical memory and the second light source can be disposed above the image generation unit.

The reading unit can further comprise an image magnifying unit disposed between the pattern recognition type optical memory and the image detecting unit.

The writing unit can further comprise an image reduction unit disposed between the pattern recognition type optical memory and the image generation unit.

According to another aspect of the present invention, there is provided a method for reading data from a pattern recognition type optical memory having a light transmittable substrate on which patterns corresponding to data are formed. The method includes: transmitting light through the pattern recognition type optical memory according to the patterns formed thereon; detecting images corresponding to the patterns and forming image signals; converting the image signals corresponding to the images into electric signals; and outputting the electric signals.

The method can further comprise magnifying the images corresponding to the patterns.

The patterns can include at least one multi-bit pattern corresponding to a predefined shape configured to represent a set of bits.

According to another aspect of the present invention, there is provided a method for writing data to a pattern recognition type optical memory by forming patterns corresponding to data on a light transmittable substrate by using light. The method includes: converting electric signals corresponding to data into image signals; generating light images corresponding to the image signals from light emitted from a light source and the image signals; and forming the patterns from the images on the light transmittable substrate of the pattern recognition type optical memory.

The method can further comprise reducing the images to allow the images to correspond to the patterns.

The patterns can include at least one multi-bit pattern corresponding to a predefined shape configured to represent a set of bits.

BRIEF DESCRIPTION OF THE DRAWINGS

Various aspects of the invention will become more apparent in view of the attached drawing figures, which are provided by way of example, not by way of limitation, in which.

DETAILED DESCRIPTION OF THE INVENTION

Detailed illustrative embodiments of the present invention are disclosed herein. However, specific structural and functional details disclosed herein are merely representative for purposes of describing such embodiments. The invention can be embodied in many alternate forms and should not be construed as limited to the illustrative embodiments set forth herein. Like reference numerals in the drawings denote like elements, and thus their description in subsequent drawings will generally be omitted.

Figure 1:
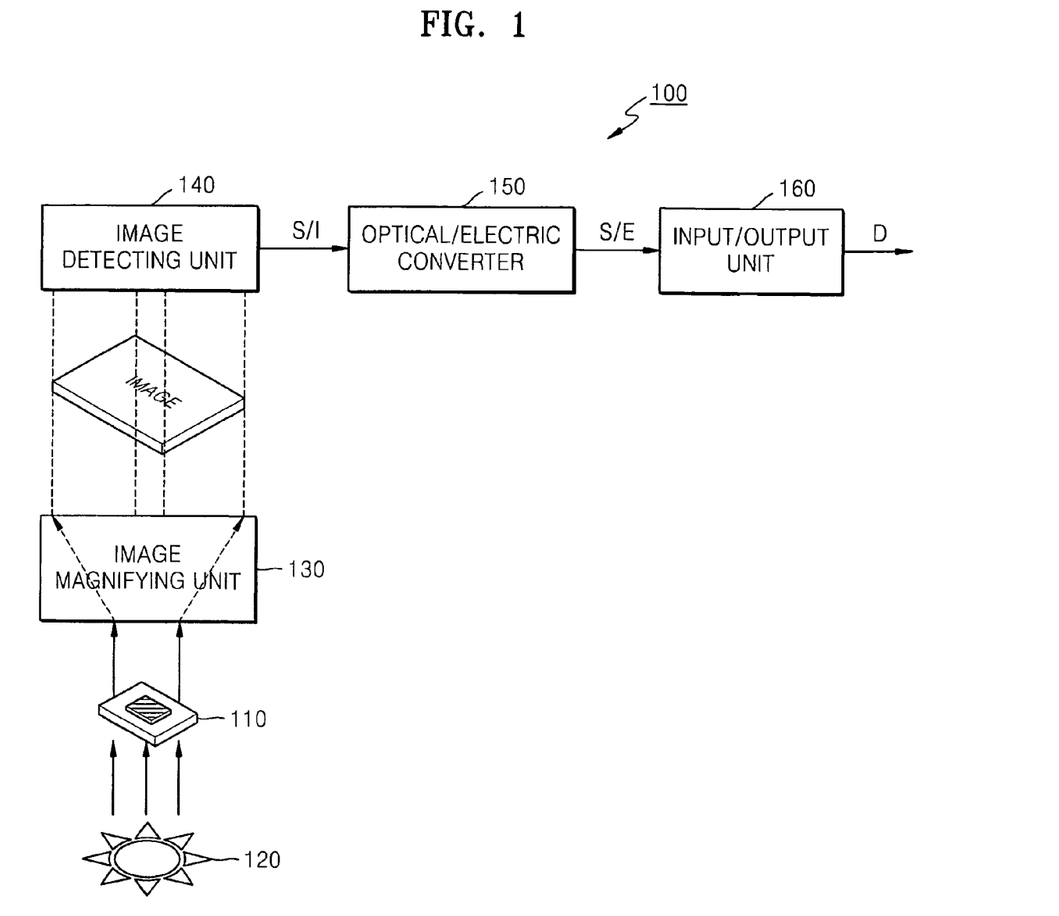
FIG. 1 is a block diagram of an embodiment of an optical memory reading device according to one aspect of the present invention.

FIG. 1 is a block diagram embodiment of an optical memory reading device 100 according to one aspect of the present disclosure. The optical memory reading device reads data stored in a pattern recognition type optical memory 110 using light.

Referring to FIG. 1, the optical memory reading device 100 includes a light source 120, an image magnifying unit 130 for magnifying an image created by a pattern of the pattern recognition type optical memory 110, an image detecting unit 140 for detecting the image corresponding to the pattern, and an optical/electric converter 150 for converting the detected image into an electric signal.

The data is stored on the pattern recognition type optical memory 110 by forming a predetermined pattern on a substrate. In particular, the substrate must be thin enough to transmit light so that the data can be read from the pattern recognition type optical memory 110 using the light.

In order to make the substrate thin enough to transmit the light, the substrate can be formed of glass, quartz, or silicon, as examples. When the substrate is formed of silicon, the cost of manufacturing the memory can be reduced. Generally, it is difficult to thinly cut silicon. Therefore, a smart-cut process has been widely used to slice silicon thin enough to transmit light. In the smart-cut process, hydrogen is first injected into the silicon and the silicon is annealed. The Si—Si bonding of the silicon is weakened by the injected hydrogen. As a result, when an outer force is applied to the silicon using, for example, water, the silicon is split into upper and lower portions with reference to a location where the injected hydrogen is located. After the silicon is cut, wet etching is performed to polish the surface of the cut silicon, thereby forming the substrate.

The pattern can be physically formed on the substrate. Alternatively, the pattern can be formed through a chemical reaction using light. Both approaches are known in the art, so not disclosed herein.

The light emitted from the light source 120 is selectively transmitted by the pattern recognition type optical memory 110 to the image magnifying unit 130 according to the pattern formed on the substrate.

The image magnifying unit 130 is disposed between the pattern recognition type optical memory 110 and the image detecting unit 140. Therefore, the image magnifying unit 130 magnifies the light image formed by light transmitted through the pattern recognition type optical memory 110 and transfers the image to the image detecting unit 140.

The image magnifying unit 130 can have at least one lens diffusing the light transmitted through the pattern recognition type optical memory 110 to magnify the image. The image magnifying unit 130 magnifies the image to a degree sufficient to allow the image detecting unit 140 to detect the pattern of the image. The magnification of the image can be adjusted by adjusting the location of the image magnifying unit 130 or the focusing distance of the lens of the image magnifying unit 130.

The light transmitted through the pattern recognition type optical memory 110 and image magnifying unit 130 is transferred to the image detecting unit 140. Since the light is selectively transmitted according to the pattern of the optical memory 110, the light transferred to the image detecting unit 140 forms an image corresponding to the pattern of the pattern recognition type optical memory 110. For example, when the pattern is formed with a single-bit, a 1 or 0 is stored according to the presence of the pattern. The image detecting unit 140 reads the data by detecting the presence of the light corresponding to the pattern of the transferred image.

When the pattern is formed as a multi-bit pattern, many shapes of patterns are defined and the pattern is formed according to one of the defined pattern shapes. Data having a plurality of bits per pattern can be stored according to the number of defined pattern shapes available. The image detecting unit 140 detects the shape of the pattern formed on the substrate to read the data.

The image detecting unit 140 transfers an image signal S/I to the optical/electric converter 150 and the optical/electric converter 150 converts the image signal S/I into an electric signal S/E. Since the images corresponding to the patterns have different shapes, the image signal S/I varies by an according intensity of light corresponding to the respective patterns. Therefore, the electric signal S/E voltage varies due to the different light intensity of the image signal S/I.

The image detecting unit 140 and the optical/electric converter 150 can be connected by an optical fiber. In this case, when the image signal S/I are transferred from the image detecting unit 140 to the optical/electric converter 150, signal loss can be reduced. The electric signal S/E is transferred to an external circuit (not shown) through an input/output unit 160. The external circuit receives data D corresponding to the electric signal S/E and processes the data D.

When the reading operation is performed on the pattern recognition type optical memory 110 using the light as described above, the patterns formed in the pattern recognition type optical memory 110 can be detected in a given time. In addition, as the time required for detecting the patterns formed in the optical memory 110 is defined by a distance divided by the speed of light, the data processing speed can be improved compared to the case when the patterns are detected by a physical process even in due consideration of the time required to convert the detected image signal into the electric signal.

Figure 2:
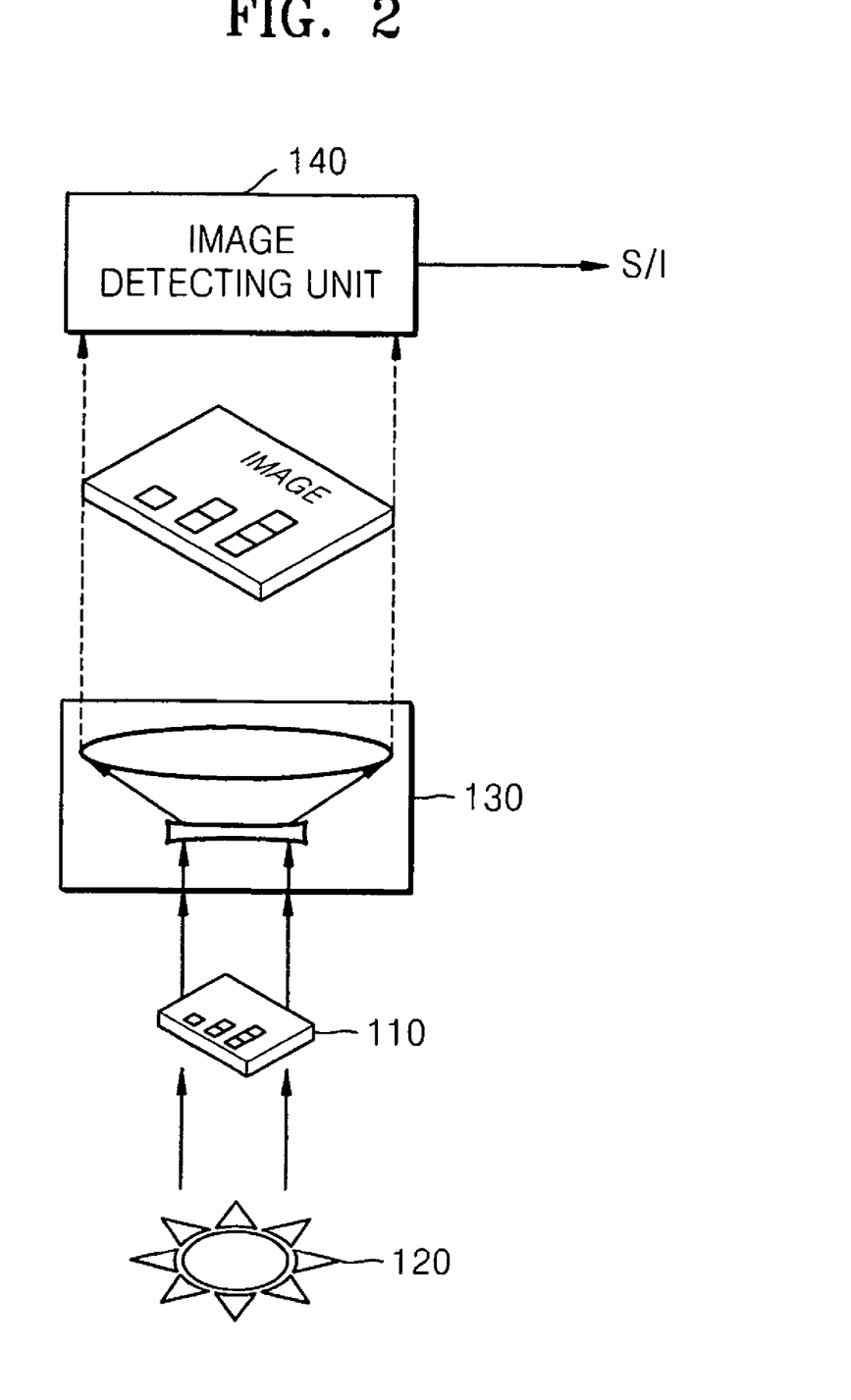
FIG. 2 is a view of an embodiment of an operation for detecting a multi-bit pattern of the pattern recognition type optical memory.

FIG. 2 is a view of an operation to detect a multi-bit pattern of the pattern recognition type optical memory 110.

Referring to FIG. 2, the pattern recognition type optical memory 110, on which the multi-bit pattern is stored, is positioned in the path of the emitted light. The light emitted from the light source 120 is transferred to the image magnifying unit 130 via the pattern recognition type optical memory 110.

For example, the image magnifying unit 130 includes at least one of a concave lens, a convex lens and a combination thereof to diffuse and focus the light that is selectively transmitted through pattern recognition type optical memory 110. An image having the pattern is magnified by the image magnifying unit 130 and is transferred to the image detecting unit 140.

The pattern of the images, each of which has a unique shape, is detected by the image detecting unit 140 and transferred to the optical/electric converter 150 as the image signal S/I. The patterns detected by the image detecting unit 140 have different intensities of light and thus the image signal S/I transferred to the optical/electric converter 150 varies according to the intensity of light thereof.

The electric signal S/I has a unique voltage according to each shape of the corresponding image signal S/I. The light source 120 and the image detecting unit 140 remain on during the conversion of the image signal S/I into the electric signal S/E. In order to properly adjust the size of the image, the image magnifying unit 130 is set at an appropriate location and fixed at the location.

In order to accurately set the relative location between the pattern recognition type optical memory 110 and the image magnifying unit 130, an align mark can be formed on a corner of the substrate of the pattern recognition type optical memory 110. In this case, the locations of the pattern recognition type optical memory 110 and the image magnifying unit 130 are adjusted after the align mark is read. The align mark can be formed before a material for the pattern is deposited on the substrate of the pattern recognition type optical memory 110.

A data processing capacity of the device for reading the data stored in the pattern recognition type optical memory 110 can be increased by providing an arrangement of two or more memories. To this end, the positions of the pattern recognition type optical memory 110 and/or the light source 120 are not fixed but can vary according to the operation required.

Figure 3:
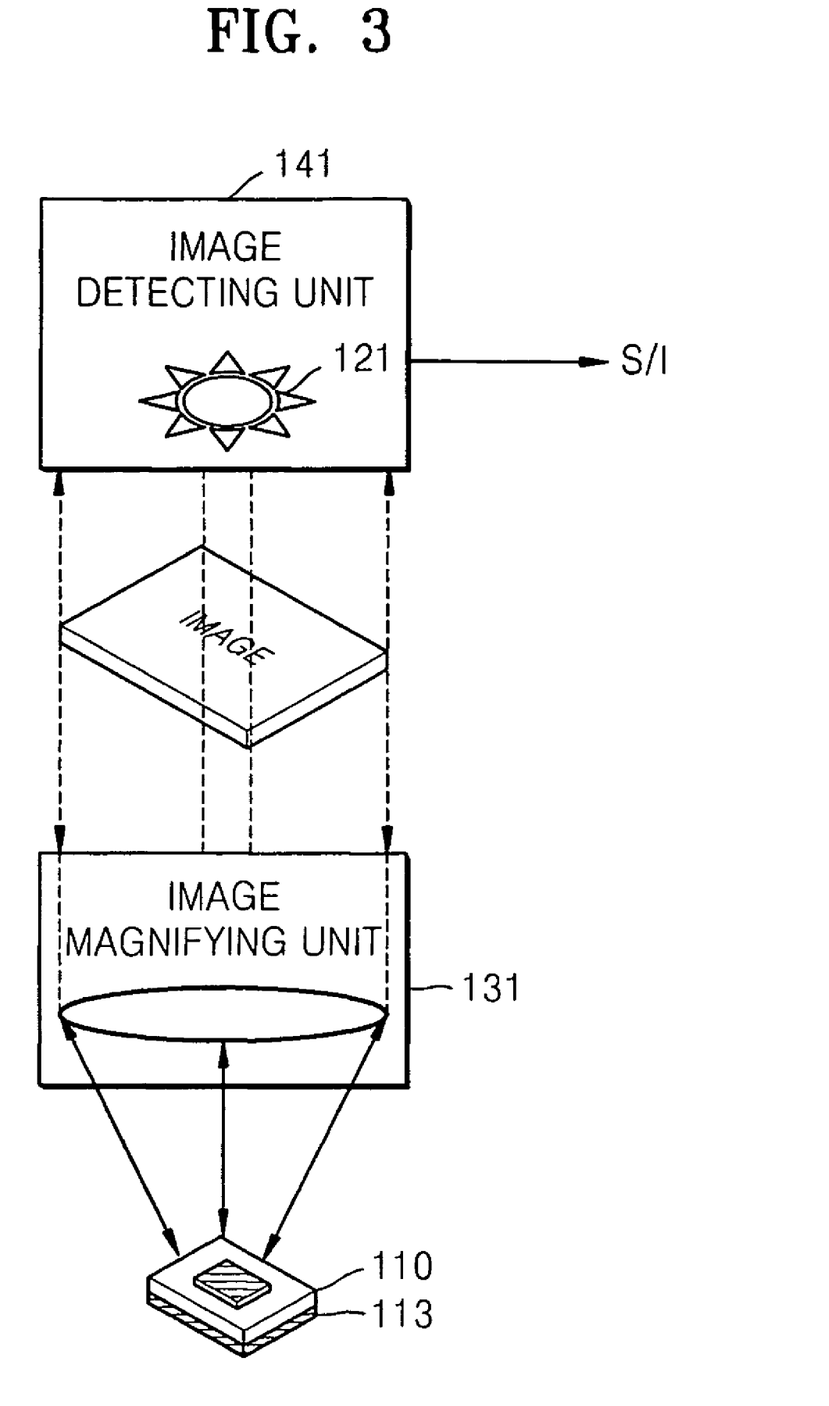
FIG. 3 is a block diagram of an embodiment of an optical memory reading device according to another aspect of the present invention.

FIG. 3 is a block diagram of an optical memory reading device according to another embodiment of the present disclosure.

Referring to FIG. 3, a pattern recognition type optical memory 110 includes a substrate having a top surface on which a pattern is formed and a bottom surface on which a reflection layer or plate 113 is formed. In order to read data stored in the pattern recognition type optical memory 110, a light source 121 is disposed above the pattern recognition type optical memory 110. The light source 121 can be disposed in an image detecting unit 141.

Light emitted from the light source 121 is transferred to the pattern recognition type optical memory 110 via an image magnifying unit 131. For example, the image magnifying unit 131 can include a convex lens for magnifying the image formed by the light reflected from the pattern recognition type optical memory 110.

A part of the light is transmitted through the pattern formed on the substrate of the pattern recognition type optical memory 110 and the rest is absorbed by a photosensitive layer (not shown). The light transmitted through the pattern recognition type optical memory 110 is reflected from the reflection plate 113 to the image magnifying unit 131 and continues to the image detecting unit 141. The image detecting unit 141 detects an image corresponding to the pattern formed on the pattern recognition type optical memory 110 and transfers an image signal S/I to an optical/electric converter 150. The optical/electric converter 150 outputs an electric signal corresponding to the image signal S/I input.

Figure 4:
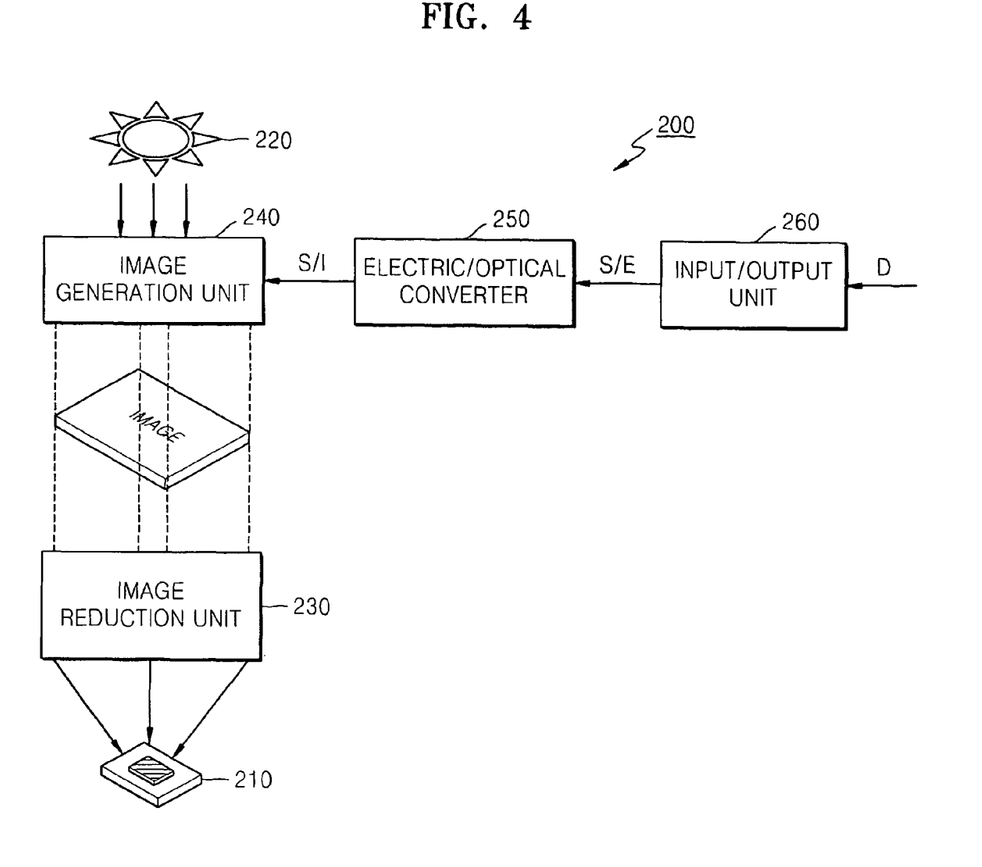
FIG. 4 is a block diagram of an embodiment of an optical memory recording device according to an aspect of the present invention.

FIG. 4 is a block diagram of an optical memory recording device 200 according to an embodiment of the present disclosure.

When the pattern recognition type optical memory is a random access memory (RAM) type, both reading and writing are possible. In FIG. 4, only elements for writing data D to the RAM type pattern recognition type optical memory are shown.

As shown in FIG. 4, an optical memory recording device 200 forms a pattern on a substrate of a pattern recognition type optical memory 210. The optical memory recording device 200 includes a light source 220, an image reduction unit 230, an image generation unit 240, and an electric/optical converter 250.

When an electric signal S/E corresponding to the data D is input by an input/output unit 260, the electric/optical converter 250 converts the electric signal S/E into an image signal S/I and transfers the image signal S/I to the image generation unit 240. Then, the image generation unit 240 generates an image corresponding to the image signal S/I.

For example, the image signal S/I transferred to the image generation unit 240 can vary in light intensity according to the voltage of the electric signal S/E. In addition, the image generation unit 240 can have a plurality of image generation frames (not shown) differing in shape and one of the image generation frames is selected according to the intensity of light of the corresponding image signal S/I. As the light emitted from the light source 220 placed above the image generation unit 240 is transmitted through the selected image generation frame, an image corresponding to the image signal S/I can be generated.

The image generated by the image generation unit 240 is transferred to the image reduction unit 230. The image reduction unit 230 includes a lens for reducing the image by focusing the light of the image. The lens can be a convex lens. The image reduced by the image reduction unit 230 is transferred to the pattern recognition type optical memory 210. At this point, a photosensitive layer, such as photoresist formed on the substrate of the pattern recognition type optical memory 210, absorbs the light of the reduced image to form the pattern through, for example, a photolithographic process. That is, the state of the photosensitive layer is selectively varied according to images corresponding to data, and thus a pattern corresponding to the image is formed on the substrate of the pattern recognition type optical memory 210.

As described above, the writing operation of the optical memory recording device 200 can be performed in almost a reverse order of the reading operation of the aforementioned optical memory reading device. In addition, in order to realize a multi-bit data pattern, two or more patterns can be formed in the pattern recognition type optical memory 210. Each pattern represents a set of bits. The image signal S/I that varies in light intensity according to the data D input is transferred from the electric/optical converter 250 to the image generation unit 240. Therefore, images that differ in shape according to the image signal S/I are transferred to the pattern recognition type optical memory 210 to create patterns for forming the multi-bit data pattern on the substrate.

Meanwhile, an optical memory read/write device for reading and writing data from or to the pattern recognition type optical memory can be realized by combining the elements of the aforementioned reading and writing devices. That is, in the data writing operation, images with differing shapes are generated according to the data input using the light emitted from the light source placed above the image generation unit. The generated images are transferred and recorded to the pattern recognition type optical memory as data. In the data reading operation, the light emitted from the light source is selectively transmitted through the pattern of the pattern recognition type optical memory 210 and the image generated by the transmission of the light is detected and read as the data.

Figure 5:
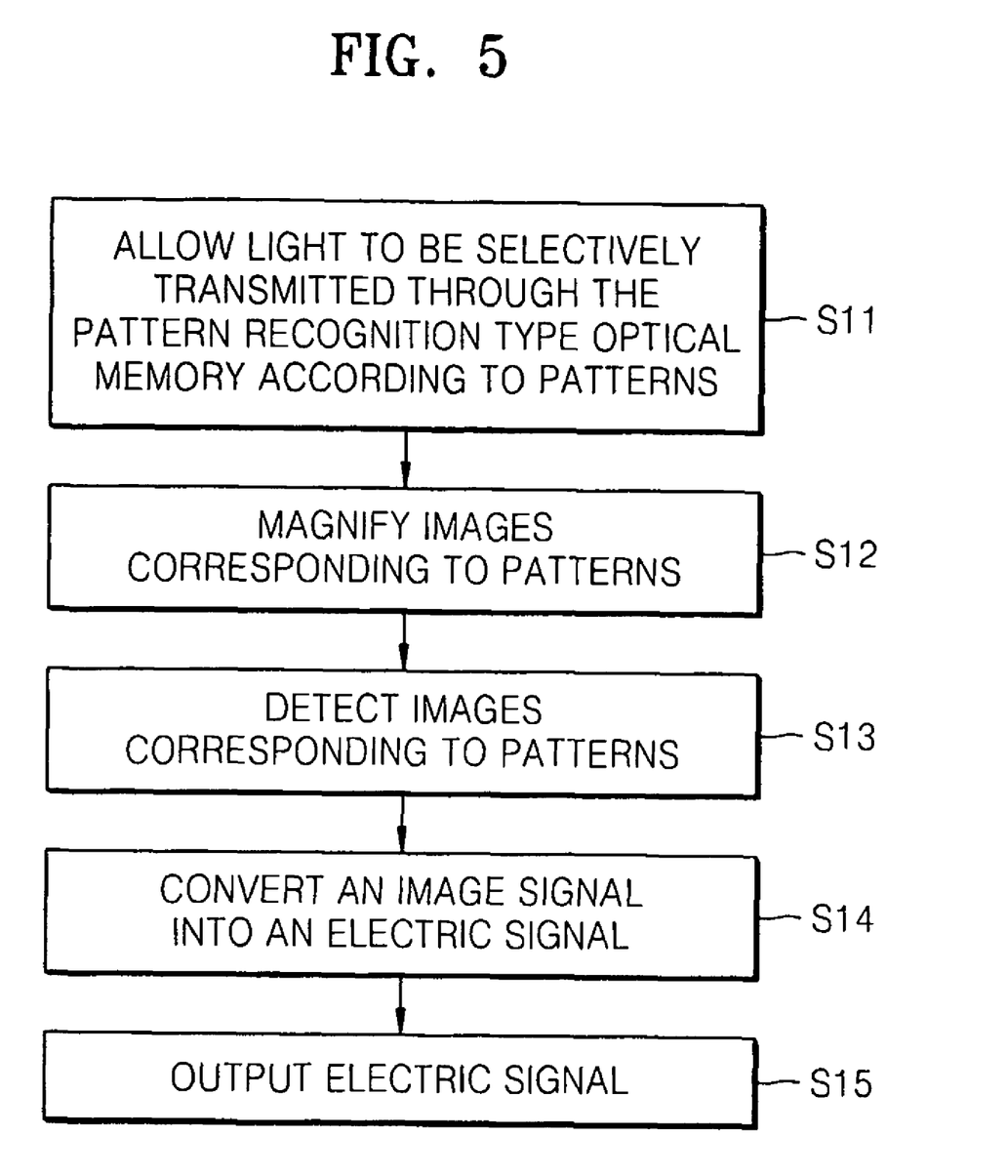
FIG. 5 is a flowchart of an embodiment of a method of reading data from a pattern recognition type optical memory according to another aspect of the present invention.

FIG. 5 is a flowchart of a method of reading data from the pattern recognition type optical memory according to an embodiment of the present disclosure.

Light is first emitted from the light source to the pattern recognition type optical memory. The light is selectively transmitted through the pattern recognition type optical memory according to the patterns formed in the pattern recognition type optical memory, in step S11.

Images corresponding to the patterns are formed by the light transmitted through the pattern recognition type optical memory. The images are magnified, in step S12, and detected, in step S13. The detected images are transferred as an image signal. The images can differ in light intensity according to the shapes of the images.

The image signal is converted into an electric signal by the optical/electric converter, in step S14. The electric signal can vary in voltage according to the light intensity of the image signal. The electric signal is then output through the input/output port, in step S15.

Figure 6:
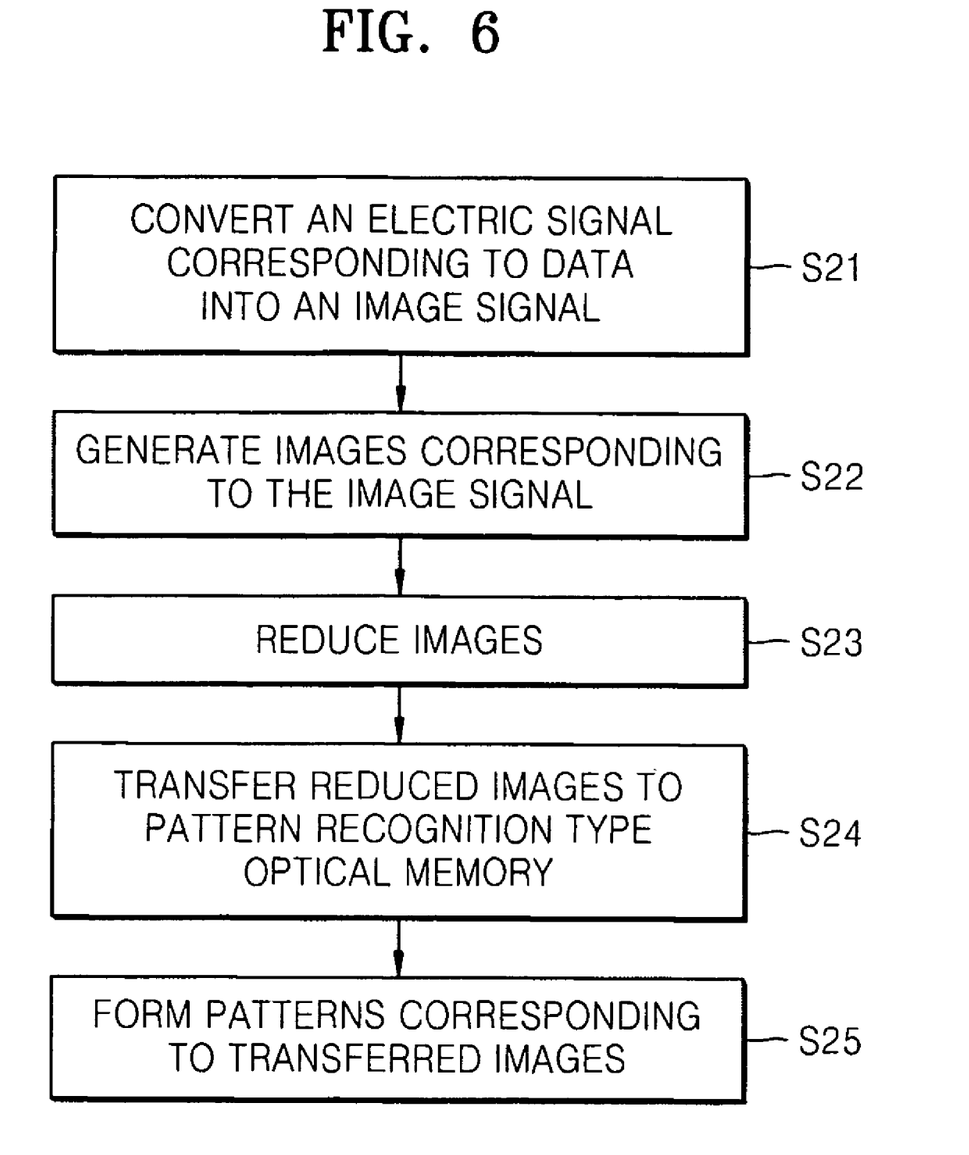
FIG. 6 is a flowchart of an embodiment of a method of writing data to a pattern recognition type optical memory according to another aspect of the present invention.

FIG. 6 is a flowchart of a method of writing data to the pattern recognition type optical memory according to another embodiment of the present disclosure.

An electric signal is first input through the input/output port according to the data and converted into an image signal by the electric/optical converter, in step S21.

Images corresponding to the patterns that are to be formed on the substrate of the pattern recognition type optical memory are generated according to the image signal, in step S22. The images are reduced to correspond to the patterns, in step S23.

The reduced images are transferred to the photosensitive layer formed on the substrate of the pattern recognition type optical memory, in step S24. The images differ in shape according to the data input. That is, the images differ in light intensity. Therefore, patterns corresponding to the required light intensity are transferred to the photosensitive layer and are formed and stored in the pattern recognition type optical memory as the data, in step S25.

While the foregoing has described what are considered to be the best mode and/or other preferred embodiments of the present invention, it will be understood by those of ordinary skill in the art that various changes in form and details can be made therein without departing from the spirit and scope of the present invention as defined by the following claims. It is intended by the following claims to claim that which is literally described and all equivalents thereto, including all modifications and variations that fall within the scope of each claim.

What is claimed is:

1. An optical memory reading device for reading data from a pattern recognition type optical memory having a light transmittable substrate on which patterns corresponding to the data are formed, the optical memory reading device comprising:
   a light source configured to direct light through the pattern recognition type optical memory, such that the light is received by a first side and an image is transmitted from a second side, opposite the first side, of the pattern recognition type optical memory;
   an image detecting unit configured to detect images corresponding to the patterns by receiving light transmitted from the second side of the pattern recognition type optical memory; and
   an optical/electric converter configured to convert an image signal input from the image detecting unit into an electric signal.

2. The optical memory reading device of claim 1, further comprising an image magnifying unit disposed between the pattern recognition type optical memory and the image detecting unit.

3. The optical memory reading device of claim 2, wherein the image magnifying unit comprises at least one lens configured to diffuse the light transmitted through the pattern recognition type optical memory.

4. The optical memory reading device of claim 3, wherein the image detecting unit and the optical/electric converter are connected by an optical fiber.

5. The optical memory reading device of claim 1, wherein the light source is placed below the pattern recognition type optical memory such that the light transmitted through the pattern recognition type optical memory is transferred to the image detecting unit.

6. The optical memory reading device of claim 1, wherein a reflection plate is disposed on a bottom surface of the substrate; and
   the light source is placed above the pattern recognition type optical memory such that the light transmitted through the pattern recognition type optical memory is reflected from the reflection plate to the image detecting unit.

7. The optical memory reading device of claim 1, wherein the patterns include at least one multi-bit pattern corresponding to a predefined shape configured to represent a set of bits.

8. An optical memory writing device for writing data to a pattern recognition type optical memory by forming patterns corresponding to the data on a non-reflective photolithographic light transmittable substrate using light, the optical memory writing device comprising:
   a light source configured to emit light;
   an electric/optical converter configured to receive an electric signal corresponding to the data and to convert the electric signal into an image signal; and
   an image generation unit configured to receive the light emitted from the light source and the image signal and to generate light images corresponding to the image signal, wherein the images are configured to form the patterns on the non-reflective photolithographic light transmittable substrate.

9. The optical memory writing device of claim 8, further comprising an image reduction unit disposed between the pattern recognition type optical memory and the image generation unit.

10. The optical memory writing device of claim 9, wherein the image reduction unit comprises at least one lens configured to focus the light images onto the pattern recognition type optical memory.

11. The optical memory writing device of claim 10, wherein the patterns include at least one multi-bit pattern corresponding to a predefined shape configured to represent a set of bits.

12. The optical memory writing device of claim 8, wherein the image generation unit and the electric/optical converter are connected by an optical fiber.

13. An optical memory read/write device comprising:
   a reading unit configured to read data from a pattern recognition type optical memory having a light transmittable substrate on which patterns are formed; and
   a writing unit configured to write input data to the pattern recognition type optical memory by forming patterns corresponding to the input data on the light transmittable substrate,
   wherein the reading unit comprises a first light source configured to direct light through the pattern recognition type optical memory, such that the light is received by a first side and an image is transmitted from a second side, opposite the first side, of the pattern recognition type optical memory, an image detecting unit configured to detect images corresponding to the patterns by receiving light transmitted through from the second side of the pattern recognition type optical memory, and an optical/electric converter configured to convert an image signal input from the image detecting unit into an electric signal; and
   wherein the writing unit comprises a second light source configured to emit light, an electric/optical converter configured to receive an electric signal corresponding to the input data and to convert the electric signal into a corresponding image signal, and an image generation unit configured to receive the light emitted from the second light source and the image signal and to generate light images corresponding to the image signal, wherein the images are configured to form patterns on the light transmittable substrate.

14. The optical memory read/write device of claim 13, wherein the first light source is disposed below the pattern recognition type optical memory and the second light source is disposed above the image generation unit.

15. The optical memory read/write device of claim 14, wherein the reading unit further comprises an image magnifying unit disposed between the pattern recognition type optical memory and the image detecting unit.

16. The optical memory read/write device of claim 14, wherein the writing unit further comprises an image reduction unit disposed between the pattern recognition type optical memory and the image generation unit.

17. A method of reading data from a pattern recognition type optical memory having a light transmittable substrate on which patterns corresponding to the data are formed, the method comprising:
   transmitting light through the pattern recognition type optical memory according to the patterns formed thereon, including receiving the light by a first side and transmitting an image from a second side, opposite the first side, of the pattern recognition type optical memory;
   detecting images corresponding to the patterns from the second side of the pattern recognition type optical memory and forming an image signal;
   converting the image signal corresponding to the images into an electric signal; and
   outputting the electric signal.

18. The method of claim 17, further comprising magnifying the images corresponding to the patterns.

19. The method of claim 17, wherein the patterns include at least one multi-bit pattern corresponding to a predefined shape configured to represent a set of bits.

20. A method of writing data to a pattern recognition type optical memory by forming patterns corresponding to the data on a non-reflective photolithographic light transmittable substrate, the method comprising:
converting an electric signal corresponding to the data into an image signal;
generating light images corresponding to the image signal from light emitted from a light source and the image signal; and
forming the patterns from the images on the non-reflective photolithographic light transmittable substrate of the pattern recognition type optical memory.

21. The method of claim 20, further comprising reducing the images to allow the images to correspond to the patterns.

22. The method of claim 20, wherein the patterns include at least one multi-bit pattern corresponding to a predefined shape configured to represent a set of bits.

* * * * *